United States Patent
Ali et al.

(10) Patent No.: US 11,327,166 B2
(45) Date of Patent: *May 10, 2022

(54) LOW COMPLEXITY SUPER-RESOLUTION TECHNIQUE FOR OBJECT DETECTION IN FREQUENCY MODULATION CONTINUOUS WAVE RADAR

(71) Applicant: TEXAS INSTRUMENTS INCORPORATED, Dallas, TX (US)

(72) Inventors: Murtaza Ali, Plano, TX (US); Dan Wang, Dallas, TX (US); Muhammad Zubair Ikram, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/832,073

(22) Filed: Mar. 27, 2020

(65) Prior Publication Data

US 2020/0292687 A1    Sep. 17, 2020

Related U.S. Application Data

(63) Continuation of application No. 14/951,014, filed on Nov. 24, 2015, now Pat. No. 10,613,208.

(Continued)

(51) Int. Cl.
*G01S 13/34* (2006.01)
*G01S 7/35* (2006.01)

(52) U.S. Cl.
CPC .............. *G01S 13/34* (2013.01); *G01S 7/352* (2013.01); *G01S 7/356* (2021.05); *G01S 13/343* (2013.01)

(58) Field of Classification Search
CPC .......... G01S 13/34–348; G01S 2007/356–358; G01S 7/352–358
See application file for complete search history.

(56) References Cited

U.S. PATENT DOCUMENTS

| 5,117,238 A | 5/1992 | Silverstein et al. |
| 5,122,732 A | 6/1992 | Engeler et al. |

(Continued)

FOREIGN PATENT DOCUMENTS

| CN | 101971050 A | 2/2011 |
| CN | 101089653 A | 3/2011 |

(Continued)

OTHER PUBLICATIONS

Grigoryan D.S. et al., Sverkhrazreshenie po dalnosti pri obrabotke radiolokatsionnykh signalov s lineynoy chastotnoy modulyatsiey kegerentnym metodom lineynogo predskazaniya vpered-nazad s prorezhivaniem dannykh. Zhurnal radioelektroniki, 2011, No. 8, p. 1, p. 2, para 1, 3, p. para 1, 2, p. 4 para 2, p. 5 paragraph 2, p. 6, para 3, p. 9 para 2, p. 10, para 2, p. 11, para 3, p. 13, fig. 2, 3, 5, 6 (http://jre.cplire.ru/iso/aug11/2/text.html).

(Continued)

*Primary Examiner* — Matthew M Barker
(74) *Attorney, Agent, or Firm* — Brian D Graham; Charles A. Brill; Frank D. Cimino

(57) ABSTRACT

In the proposed low complexity technique a hierarchical approach is created. An initial FFT based detection and range estimation gives a coarse range estimate of a group of objects within the Rayleigh limit or with varying sizes resulting from widely varying reflection strengths. For each group of detected peaks, demodulate the input to near DC, filter out other peaks (or other object groups) and decimate the signal to reduce the data size. Then perform super-resolution methods on this limited data size. The resulting distance estimations provide distance relative to the coarse estimation from the FFT processing.

20 Claims, 4 Drawing Sheets

Related U.S. Application Data

(60) Provisional application No. 62/162,405, filed on May 15, 2015.

(56) References Cited

U.S. PATENT DOCUMENTS

| | | | |
|---|---|---|---|
| 5,168,214 A | 12/1992 | Engeler et al. | |
| 5,748,507 A | 5/1998 | Abatzoglou et al. | |
| 8,428,532 B2* | 4/2013 | Romain | H03H 17/0685 |
| | | | 455/232.1 |
| 2010/0265138 A1 | 10/2010 | Biem et al. | |
| 2010/0271254 A1 | 10/2010 | Kanamoto et al. | |
| 2015/0338514 A1 | 11/2015 | Sato et al. | |

FOREIGN PATENT DOCUMENTS

| | | |
|---|---|---|
| CN | 102540190 A | 7/2012 |
| CN | 102788980 A | 11/2012 |
| CN | 102819018 A | 12/2012 |
| CN | 102967858 A | 3/2013 |
| CN | 103777199 A | 5/2014 |
| CN | 103823215 A | 5/2014 |
| CN | 104434093 A | 3/2015 |
| UA | 12453 A | 2/1997 |
| WO | 2014106907 A1 | 7/2014 |
| WO | WO2014106907 | 7/2014 |

OTHER PUBLICATIONS

Chinese Office Action for Chinese Application No. 201680036357.2 dated Jan. 20, 2021; 6 pages.

Search Report for Chinese Application No. 201680036357.2 dated Jan. 20, 2021; 3 pages.

Li, et al.; "Frequency Estimation Based on Modulation FTT and MUSIC Algorithm"; 2010 First International Conference on Pervasive Computing, Signal Processing and Application; IEEE Xplore: 2010; pp. 525-528.

Fu, et al; "Parameter Extraction of Pulse Doppler Fuse Signal"; Department of Electronics Engineering, Beijing Institute of Technology"; Beijing Institute of Remote Sensing"; China Academic Journal Electronic Publishing House; Apr. 30, 2003; 5 pages.

* cited by examiner

LOW COMPLEXITY SUPER-RESOLUTION TECHNIQUE FOR OBJECT DETECTION IN FREQUENCY MODULATION CONTINUOUS WAVE RADAR

CROSS-REFERENCE TO RELATED APPLICATIONS

This application is a continuation of U.S. patent application Ser. No. 14/951,014, filed Nov. 24, 2015, which claims priority to U.S. Provisional Patent Application No. 62/162,405, filed May 15, 2015, each of which is incorporated by reference herein in its entirety.

TECHNICAL FIELD OF THE INVENTION

The technical field of this invention is radar object detection and corresponding object location determination.

BACKGROUND OF THE INVENTION

In classical object detection technique, the minimum distance to resolve two nearby objects (radar reflections) is limited by the so called Rayleigh distance. These techniques also often fail to find smaller objects in presence of close by larger objects. There exist several techniques known as super-resolution techniques to overcome these methods which can discriminate between objects even below the classical limits. However, these techniques are computationally expensive and rarely implemented in practice.

SUMMARY OF THE INVENTION

The solution to the computational problem is to perform an initial object detection using the classical method. In the context of FMCW (Frequency Modulated Continuous Wave) radar, this was done through Fast Fourier Transforms of the input data and then by searching for high valued amplitudes. Once potential objects are detected, super-resolution algorithms are performed around each of the detected objects or reflections. To reduce computational complexity of this search, the signal is demodulated so the detected object lies near DC values and then sub-sampled so the number of operating data points is reduced. The super-resolution technique then works on this reduced set of data thereby reducing computational complexity.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
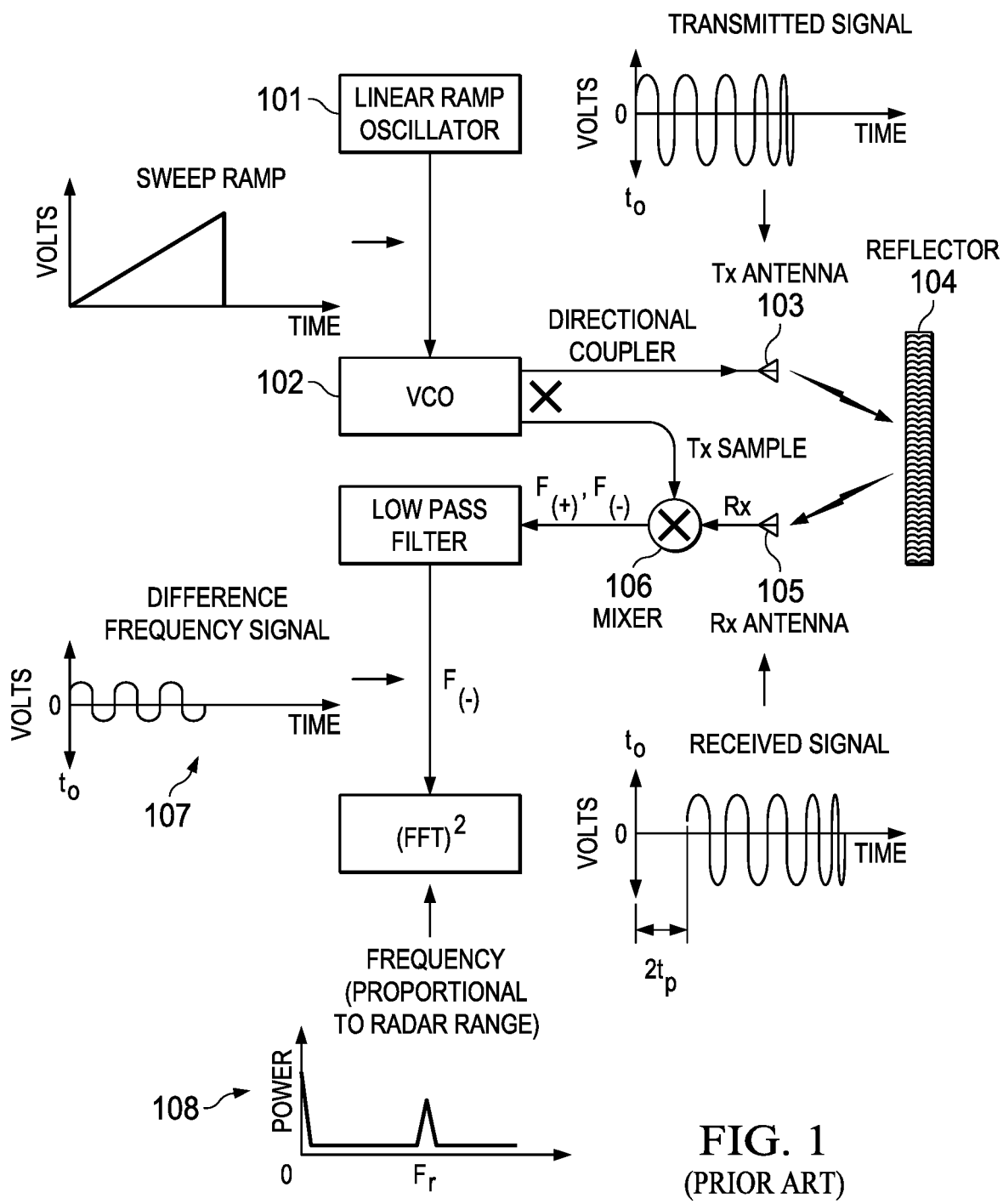
FIG. 1 illustrates a prior art FMCW radar to which this invention is applicable.

FMCW radars are often used to determine the location of an object and its speed of movement. These radars are used in automotive applications, industrial measurements, etc. A typical FMCW technique is shown in FIG. 1.

A chirp signal generated by ramp oscillator 101 and Voltage Controlled Oscillator (VCO) 102 (where the frequency is changed linearly) is transmitted by antenna 103 and reflected from object(s) 104. The reflected signal is received by antenna 105, mixed with transmitted signal in mixer 106 and the resulting beat frequency 107 is dependent on the distance of the object as given by $$\text{beat frequency} = \frac{B(2R)}{T_r c}$$

Thus, if the beat frequency or frequencies for multiple objects can be estimated, the distances to those objects can be estimated. In the above equation, R is the range of the object, B is the bandwidth of the chirp signal, $T_r$ is the time duration for the chirp and c is the speed of light.

In one commonly used object detection and distance estimation technique, the frequency is estimated using Fourier transforms. Usually an FFT (Fast Fourier Transform) is used. The peaks of the FFT output shown in graph 108 correspond to the objects detected and the frequencies of the peak correspond to the distances. In this technique, the minimum distance to resolve two objects and determine their respective distances are known as Rayleigh limit and is given by $$\frac{c}{2B}$$

One issue with this detection method is when the reflectivities of the two closely spaced objects are different, the larger object tends to hide the smaller object.

In order to overcome the above limitations, super-resolution techniques have been proposed. Two such techniques are described here.

The first technique is called MUSIC (Multiple Signal Classification): it divides the signal auto-correlation matrix 301 $R_s$, into signal subspace and noise subspace 302. This is done by first using singular value decomposition (SVD) 303

$$R_s = Q \Lambda Q^H$$

and then extracting the noise subspace from the eigenvectors with lowest eigenvalues 304

$$Q_n = Q(:, N-M, N)$$

N: data dimension, M: signal dimension

This technique then creates MUSIC pseudo spectrum orthogonal to noise subspace using the following equation 305

$$P_{MUSIC}(\phi) = \frac{1}{S^H(\phi) Q_n Q_n^H s(\phi)^a}$$

and finally a search for peaks in the above spectrum is carried out to determine the presence and the location of objects in 306.

The second technique called MPM (Matrix Pencil Method):
create a Hankel matrix 401 with delayed signal vector $$S=[s_0 s_1 s_2 \ldots s_{L-1} s_L]=[S_0 s_L]=[s_0 S_1]$$

$$s_n=[s(n)s(n+1) \ldots s(n+N-L-1)]^T$$

and then solve a generalized eigenvalue problem of the matrix pencil in 402 (these eigenvalues encode the frequency estimates)

$$S_1 - \xi S_0$$

The steps to solve the generalized eigenvalues problems are as follows: perform Singular Value Decomposition (SVD) 403 and choose M highest eigenvalues in 404

$$S^H S = U \Lambda U^H; U_M = U(:,1:M)$$

extract two eigenvector matrices in 405

$$U_{0M} = U(1:L-1,:), U_{1M} = U(2:L,:)$$

perform a second SVD in 406

$$U_{1M}^H U_{0M}$$

and extract frequencies from the resulting eigenvalues in 407 (the generalized eigenvalues).

Various variations of these techniques have been proposed. But they all have the common operations of performing eigen-analysis of signal vectors. For a data size of N, the eigen-analysis has computational requirement on the order of $N^3$. For typical applications N is of the order of 1000. This makes implementation of these techniques unfeasible for embedded real time applications.

Note that in FMCW radar applications, additional signal dimensions of speed, azimuth and elevation angle can be used whose impact is to increase the data size by several orders.

Figure 2:
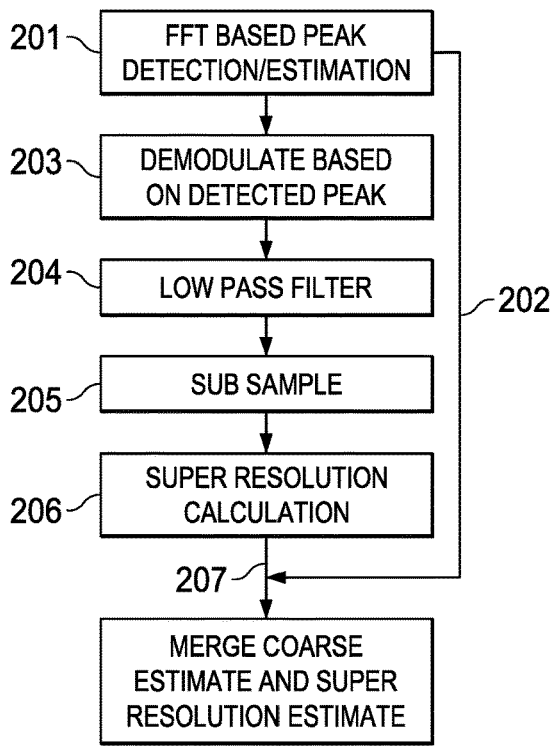
FIG. 2 illustrates the signal data processing of this invention.

In the proposed low complexity technique illustrated in FIG. 2, the super resolution techniques are combined with the FFT based method to create a hierarchical approach. First an FFT based detection and range estimation is performed in 201. This gives a coarse range estimate 202 of a group of objects within the Rayleigh limit or with varying sizes resulting from widely varying reflection strengths. For each group of detected peaks, the input is demodulated to near DC in 203, other peaks (or other object groups) are filtered out in 204 and the signal is then sub-sampled in 205 to reduce the data size. Super-resolution methods are then performed on this limited data size in 206. The resulting fine range estimations 207 provide distance relative to the coarse estimation done using FFT processing.

The following study shows simulation results using the following parameters: signal bandwidth of 4 GHz; chirp time duration of 125 microseconds; 2 objects at 5.9 meters and 6 meters in two examples (1) the objects have the same reflectivity and (2) the objects differ in reflectivity by 25 dB. The reflectivities are measured in terms of RCS (radar cross section).

Figure 5:
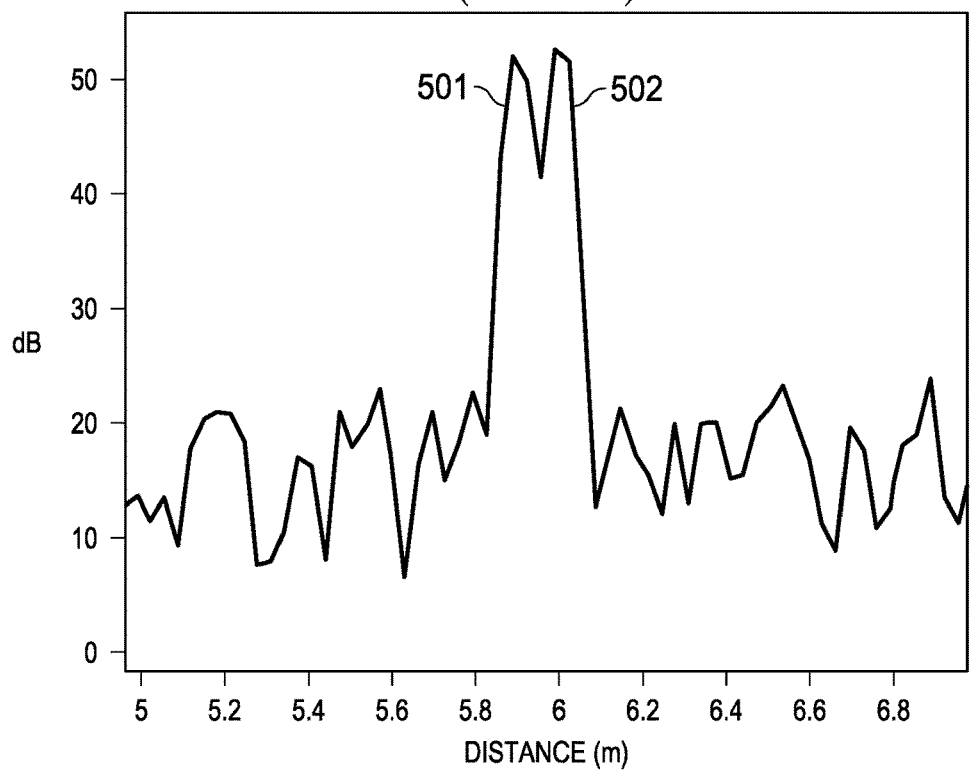
FIG. 5 illustrates results of conventional processing for two objects as differing ranges with the same reflectivity.
Figure 6:
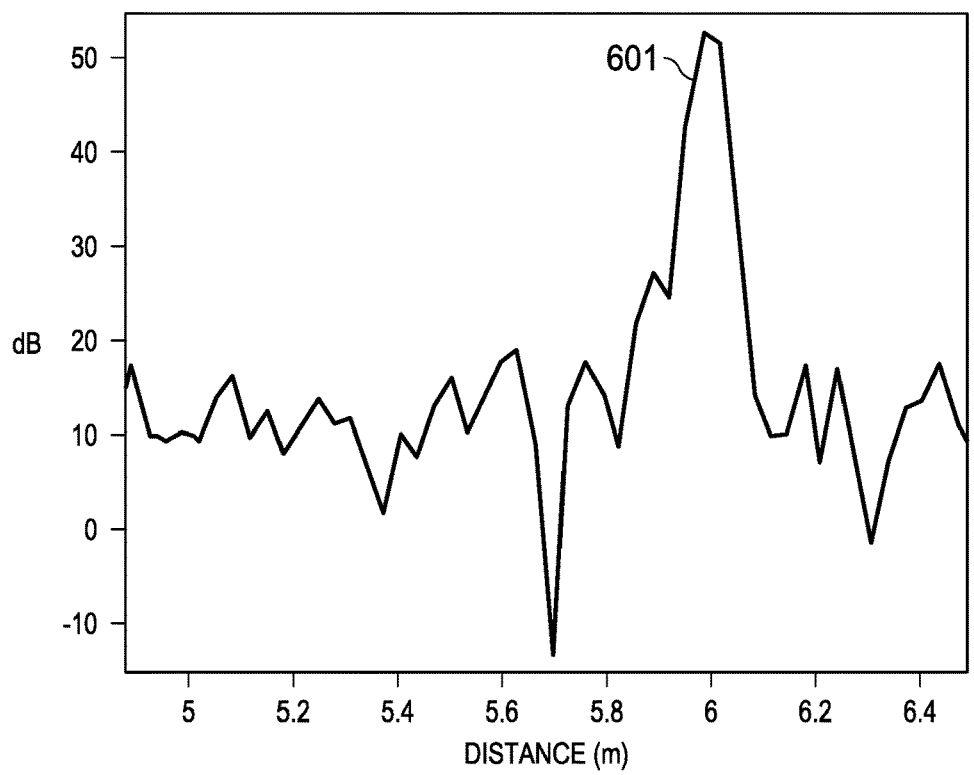
FIG. 6 illustrates results of conventional processing for two objects as differing ranges with one object having 25 dB less reflectivity.

The output of the prior art FFT based processing are shown in FIGS. 5 and 6. FIG. 5 (corresponding to the same RCS of two objects) shows the two peaks 501 and 502 corresponding to the two objects. In FIG. 6 where the RCS of one object is 25 dB lower, the smaller object cannot be detected and is hidden with the spread of the peak of the larger object 601. The data size used is 512 data points.

Figure 3:
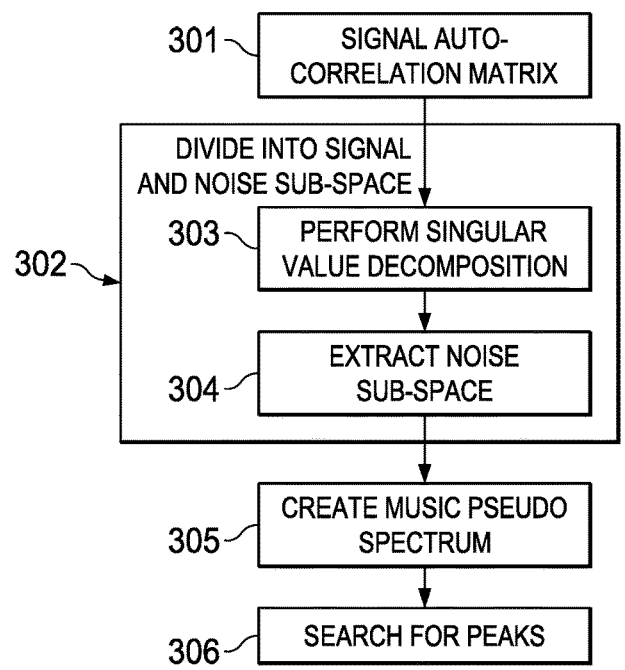
FIG. 3 shows the steps involved in the multiple signal classification algorithm.
Figure 4:
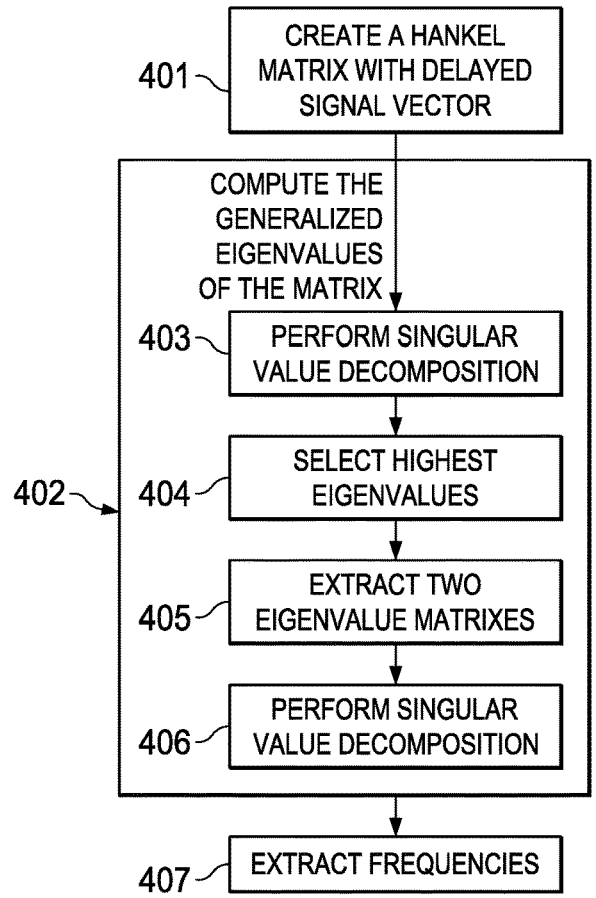
FIG. 4 shows the steps involved in the matrix pencil algorithm.
Figure 7:
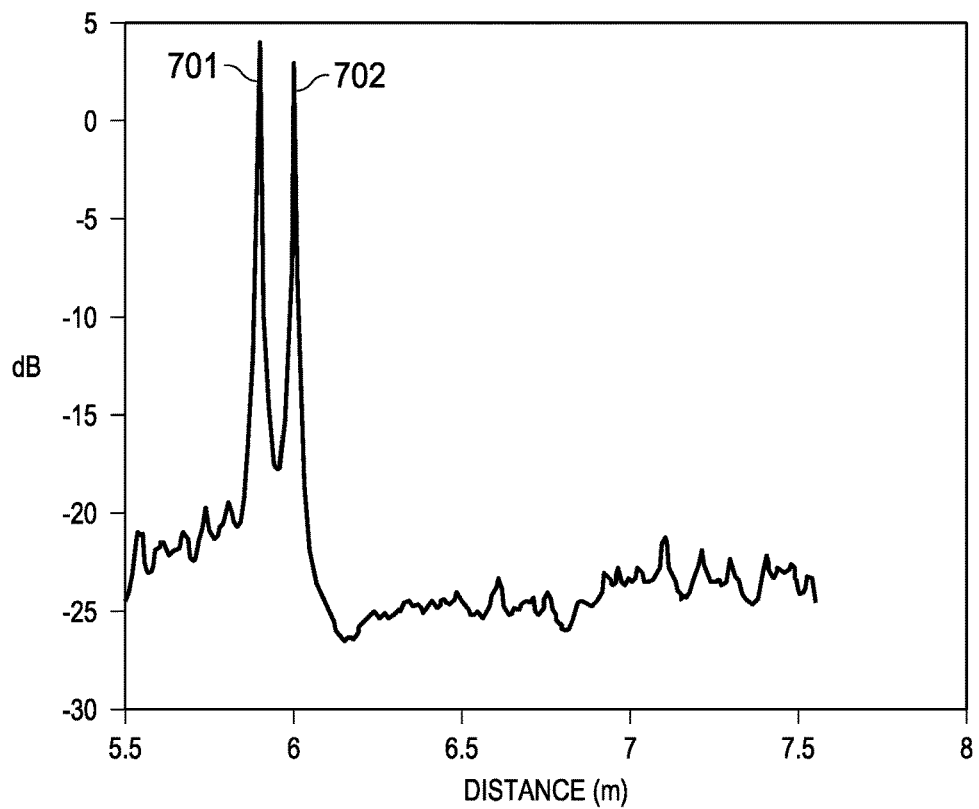
FIG. 7 illustrates results of processing according to this invention for two objects as differing ranges with the same reflectivity.
Figure 8:
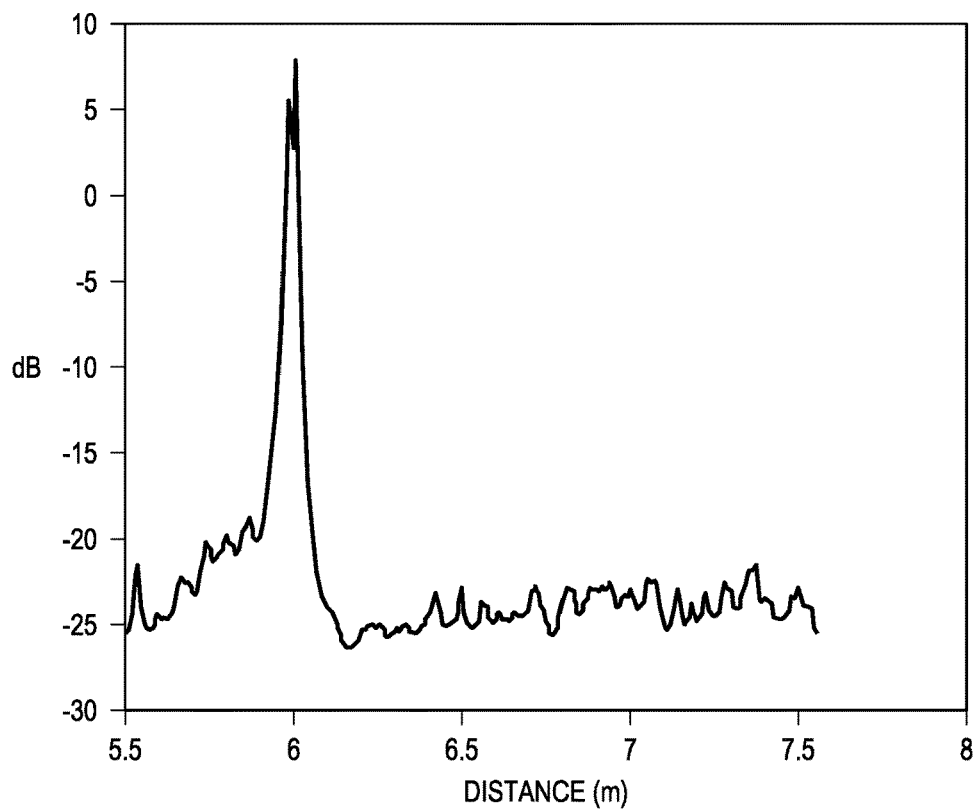
FIG. 8 illustrates results of processing according to this invention for two objects as differing ranges with one object having 25 dB less reflectivity.

The data size is then reduced to 32 data points using the technique of this invention leading a computation complexity reduction by a factor of $16^3$. The output of the MUSIC method (described in FIG. 3) is shown in FIGS. 7 and 8. FIG. 7 shows much sharper peaks 701 and 702 for the case of same RCS. FIG. 8 shows that an object is still missed for the case of 25 dB RCS difference.

It is not possible to provide pictorial output from the simulation of the MPM matrix pencil method like shown in FIGS. 7 and 8. However, if we run matrix pencil on this reduced data set, it provides two distance estimates for both the same RCS, and 25 dB RCS difference. The results are noted below. For the same RCS: the distance estimates are distance1=6.0012 m and distance2=5.8964 m. For 25 dB difference RCS: the distance estimates are distance1=5.9990 m and distance2=5.8602 m. Comparing with the fact that the objects are placed at 5.9 meters and 6 meters, the MPM method provided the distances accurately with much reduced complexity.

What is claimed is:

1. A method comprising:
    transmitting a first signal using a transmitter;
    receiving a reflected signal produced in response to the first signal by a set of objects that includes a first object;
    mixing the reflected signal with the first signal to determine a beat frequency signal for the first object;
    applying a Fourier transform to the beat frequency signal to produce a Fourier transform signal that includes a first peak corresponding to the first object and a second peak that does not correspond to the first object;
    determining, based on the first peak in the Fourier transform signal, a first range estimate of a distance of the first object relative to the transmitter;
    applying demodulation to a portion of the Fourier transform signal that includes the first peak and the second peak to produce a demodulated signal;
    applying filtering to the demodulated signal to reduce an effect of the second peak to produce a filtered signal;
    sub-sampling the filtered signal to produce a sub-sampled data set; and
    determining, based on the sub-sampled data set, a second range estimate of the distance of the first object relative to the transmitter.

2. The method of claim 1, wherein the first signal has a linearly changing frequency.

3. The method of claim 1, wherein the determining of the first range estimate is based on a frequency of the first peak in the Fourier transform signal corresponding to the distance of the first object relative to the transmitter.

4. The method of claim 1, wherein the Fourier transform signal has a first data size and the sub-sampled data set has a second data size that is less than the first data size.

5. The method of claim 1, wherein the second range estimate is more precise than the first range estimate.

6. The method of claim 1, wherein the determining of the second range estimate includes performing an eigen-analysis of the sub-sampled data set.

7. The method of claim 1, wherein the determining of the second range estimate includes performing a multiple signal classification (MUSIC) super resolution processing technique to the sub-sampled data set by:
    applying singular value decomposition (SVD) to a signal auto-correlation matrix corresponding to the sub-sampled data set to obtain an SVD result;
    dividing the signal auto-correlation matrix into a signal subspace and a noise subspace by extracting, from the SVD result, eigenvectors from the SVD result that have lowest eigenvalues as corresponding to the noise subspace, remaining eigenvectors from the SVD result corresponding to the signal subspace;
creating a MUSIC pseudo-spectrum orthogonal to the noise subspace; and
searching for peaks in the MUSIC pseudo-spectrum.

8. The method of claim 1, wherein the determining of the second range estimate includes performing a matrix pencil method (MPM) super resolution processing technique to the sub-sampled data set by:
creating a Hankel matrix with a delayed signal vector;
applying a first singular value decomposition (SVD) on the Hankel matrix to obtain a first SVD result;
selecting a predetermined number of highest eigenvalues from the first SVD result;
extracting two eigenvector matrices;
applying a second SVD on the two extracted eigenvector matrices to obtain a second SVD result; and
searching for peaks within eigenvalues of the second SVD result.

9. The method of claim 1, wherein the applying of the Fourier transform to the beat frequency signal includes applying a Fast Fourier transform to the beat frequency signal.

10. An apparatus comprising:
a voltage controlled oscillator configured to produce a first signal;
a first antenna coupled to the voltage controlled oscillator and configured to transmit a radar signal based on the first signal;
a second antenna configured to produce a reflected signal based on a reflected radar signal reflected from a set of objects that includes a first object;
a mixer configured to mix the first signal and the reflected signal to produce a beat frequency signal;
a processor configured to:
apply a Fourier transform to the beat frequency signal to produce a Fourier transform signal that includes a first peak corresponding to the first object and a second peak that does not correspond to the first object;
demodulate the Fourier transform to produce a demodulated signal;
filter the demodulated signal to reduce an effect of the second peak on the demodulated signal to produce a filtered signal;
sub-sample the filtered signal to produce a sub-sampled data set; and
determine, based on the sub-sampled data set, a distance of the first object relative to the first antenna.

11. The apparatus of claim 10 further comprising a linear ramp generator coupled to the voltage controlled oscillator, wherein the linear ramp generator and the voltage controlled oscillator are configured to produce the first signal to have a linearly changing frequency.

12. The apparatus of claim 10, wherein:
the distance of the first object relative to the first antenna determined based on the sub-sampled data set is a first distance estimate; and
the processor is configured to determine a second distance estimate of the first object relative to the first antenna based on the Fourier transform signal.

13. The apparatus of claim 12, wherein the processor is configured to determine the second distance estimate of the first object based on a frequency of the first peak in the Fourier transform signal corresponding to the distance of the first object relative to the first antenna.

14. The apparatus of claim 12, wherein the first distance estimate is more precise than the second distance estimate.

15. The apparatus of claim 10, wherein the Fourier transform signal has a first data size and the sub-sampled data set has a second data size that is less than the first data size.

16. The apparatus of claim 10, wherein the processor is configured to determine the distance of the first object relative to the first antenna by performing an eigen-analysis of the sub-sampled data set.

17. The apparatus of claim 10, wherein the processor is configured to determine the distance of the first object relative to the first antenna by performing a multiple signal classification (MUSIC) super resolution processing technique to the sub-sampled data set by:
applying singular value decomposition (SVD) to a signal auto-correlation matrix corresponding to the sub-sampled data set to obtain an SVD result;
dividing the signal auto-correlation matrix into a signal subspace and a noise subspace by extracting, from the SVD result, eigenvectors from the SVD result that have lowest eigenvalues as corresponding to the noise subspace, remaining eigenvectors from the SVD result corresponding to the signal subspace;
creating a MUSIC pseudo-spectrum orthogonal to the noise subspace; and
searching for peaks in the MUSIC pseudo-spectrum.

18. The apparatus of claim 10, wherein the processor is configured to determine the distance of the first object relative to the first antenna by performing a matrix pencil method (MPM) super resolution processing technique to the sub-sampled data set by:
creating a Hankel matrix with a delayed signal vector;
applying a first singular value decomposition (SVD) on the Hankel matrix to obtain a first SVD result;
selecting a predetermined number of highest eigenvalues from the first SVD result;
extracting two eigenvector matrices;
applying a second SVD on the two extracted eigenvector matrices to obtain a second SVD result; and
searching for peaks within eigenvalues of the second SVD result.

19. The apparatus of claim 10, wherein the processor is configured to apply the Fourier transform to the beat frequency signal by applying a Fast Fourier transform to the beat frequency signal.

20. A method comprising:
transmitting a first signal using a transmitter;
receiving a reflected signal produced in response to the first signal by a set of objects that includes a first object;
mixing the reflected signal with the first signal to determine a beat frequency signal for the first object;
applying a Fourier transform to the beat frequency signal to produce a Fourier transform signal that includes a peak corresponding to the first object;
applying demodulation to a portion of the Fourier transform signal that includes the peak to produce a demodulated signal;
applying filtering to the demodulated signal using a filter configured to retain an effect of the peak to produce a filtered signal;
sub-sampling the filtered signal to produce a sub-sampled data set; and
determining, based on the sub-sampled data set, an estimate of a distance of the first object relative to the transmitter.

* * * * *